(12) United States Patent
Gao et al.

(10) Patent No.: US 10,547,419 B2
(45) Date of Patent: Jan. 28, 2020

(54) COMMUNICATION METHOD AND BASE STATION

(71) Applicant: ZTE CORPORATION, Guangdong (CN)

(72) Inventors: Yin Gao, Guangdong (CN); Lin Chen, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/753,699

(22) PCT Filed: Jun. 2, 2016

(86) PCT No.: PCT/CN2016/084550
§ 371 (c)(1),
(2) Date: Feb. 20, 2018

(87) PCT Pub. No.: WO2017/032124
PCT Pub. Date: Mar. 2, 2017

(65) Prior Publication Data
US 2018/0241520 A1 Aug. 23, 2018

(30) Foreign Application Priority Data
Aug. 21, 2015 (CN) .......................... 2015 1 0520472

(51) Int. Cl.
*H04L 5/00* (2006.01)
*H04W 76/14* (2018.01)
(Continued)

(52) U.S. Cl.
CPC ........ *H04L 5/0032* (2013.01); *H04L 41/0672* (2013.01); *H04W 72/048* (2013.01);
(Continued)

(58) Field of Classification Search
None
See application file for complete search history.

(56) References Cited

U.S. PATENT DOCUMENTS

2015/0358866 A1* 12/2015 Xu ........................ H04W 36/00
370/331
2016/0037488 A1* 2/2016 Li ........................ H04W 76/14
370/329
(Continued)

FOREIGN PATENT DOCUMENTS

CN 104735638 A 6/2015

OTHER PUBLICATIONS

International Search Report dated Aug. 24, 2016 for International Application No. PCT/CN2016/084550, 5 pages.
(Continued)

*Primary Examiner* — Diane L Lo
(74) *Attorney, Agent, or Firm* — Knobbe Martens Olson & Bear LLP (57) ABSTRACT

Provided is a communication method, including: receiving, by a first station, a first communication message from a second base station through an X2 interface, where the first communication message carries first device-to-device (D2D) capability information for representing a D2D capability of the second base station; and determining, by the first base station, whether to add the second base station to provide a dual-connectivity service to user equipment based on the first D2D capability information. A base station is also provided.

18 Claims, 3 Drawing Sheets

(51) Int. Cl.
  *H04L 12/24*    (2006.01)
  *H04W 72/04*   (2009.01)
  *H04W 76/18*   (2018.01)
  *H04W 8/00*    (2009.01)

(52) U.S. Cl.
  CPC ....... *H04W 72/0426* (2013.01); *H04W 76/14* (2018.02); *H04W 8/005* (2013.01); *H04W 76/18* (2018.02)

(56) References Cited

U.S. PATENT DOCUMENTS

| | | | |
|---|---|---|---|
| 2016/0249259 A1* | 8/2016 | Park | H04W 36/00 |
| 2016/0255554 A1* | 9/2016 | Ke | H04W 76/14 |
| | | | 455/436 |
| 2018/0192332 A1* | 7/2018 | Joshi | H04W 36/305 |

OTHER PUBLICATIONS

Written Opinion of the International Searching Authority dated Aug. 24, 2016 for International Application No. PCT/CN2016/084550, 3 pages.

ZTE. "Discussion on the coordination of D2D resource for inter-cell D2D discovery and communication", 3GPP TSG-RAN WG3 Meeting #83, R3-140047, Feb. 14, 2014.

Catt. "Support on discovery in inter-frequency/inter-PLMN scenario", 3GPP TSG RAN WG3#88, May 29, 2015.

* cited by examiner

FIG. 1

Receive, by a first base station, a first communication message from a second base station through an X2 interface, where the first communication message carries first D2D capability information for representing a D2D capability of the second base station — S201

Determine, by the first base station, whether to add the second base station to provide a dual-connectivity service to user equipment based on the first D2D capability information — S202

COMMUNICATION METHOD AND BASE STATION

CROSS REFERENCE TO RELATED APPLICATIONS

This application is the U.S. National Phase Application under 35 U.S.C. § 371 of International Application No. PCT/CN2016/084550 filed on Jun. 2, 2016, designating the U.S. and published as WO 2017/032124 A1 on Mar. 2, 2017, which claims the benefit of Chinese Patent Application No. 201510520472.4, filed on Aug. 21, 2015, which are hereby incorporated by reference in their entirety.

TECHNICAL FIELD

The present application relates to, but not limited to, the field of wireless communications, and particularly, to a communication method and a base station.

BACKGROUND

Figure 1:
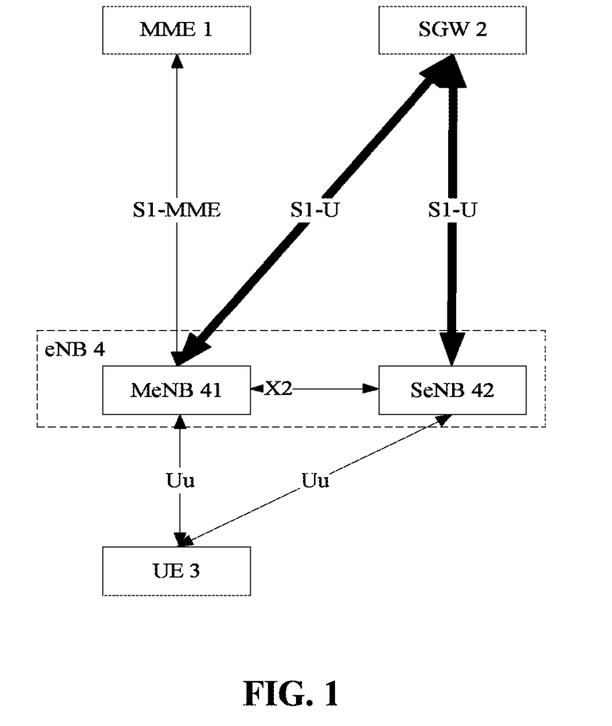
FIG. 1 is a diagram showing a system architecture of a femtocell base station in the related art.

Due to the scarcity of spectrum resources and the explosion of heavy traffic services from mobile users, in order to increase user throughput and enhance mobility, there is an increasingly demand for hotspot coverage at high-frequency points (such as 3.5 GHz), and low-power nodes serve as new application scenarios. However, since signal attenuation at the high-frequency points is rather severe, new cells have relatively small coverage areas and do not share a station (STA) with the existing cells. Therefore, if the user moves between the new cells or moves between a new cell and an existing cell, it is inevitable to cause a frequent handover process, which leads to the frequent transfer of user information between base stations, thus resulting in a great signaling impact on a core network. To address this problem, a LTE network introduces a new system architecture, that is, a femtocell system. As shown in FIG. 1, the system architecture includes a mobility management entity (MME) 1, a serving gateway (SGW) 2, user equipment (UE) or referred to as a terminal 3, and base stations (eNBs) 4 including a master eNB 41 and a secondary eNB (SeNB) 42. There is a Uu interface between the UE 3 and each of the eNBs 4. There is a S1-MME (S1 for the control plane) interface between the MeNB 41 and the MME 1. There are S1-U interfaces between the MeNB 41 and the SGW 2 and between the SeNB 42 and the SGW 2. There is an X2 interface between the MeNB 41 and the SeNB 42. User data may be delivered from the core network to the UE through the MeNB or the SeNB. After the UE accesses the MeNB, dual connectivity may be achieved by adding, modifying, or deleting the SeNB.

Meanwhile, with the development of wireless multimedia services, the demand for high data rate and better user experience is growing, putting higher requirements on system capacity and coverage of traditional cellular networks. On the other hand, the popularity of applications such as social networks, short-range data sharing and local advertising increases the demand for proximity services, i.e., knowing and communicating with people or things of interest in the neighborhood. Traditional cell-based cellular networks have obvious limitations in high data rate and support of proximity services. Against this demand background, a device-to-device (D2D) technology on behalf of a new direction for development of future communication technologies comes into being. The application of the D2D technology may reduce the burden on the cellular networks, reduce the battery power consumption of the user equipment, increase the data rate, and improve the robustness of a network infrastructure, so as to meet requirements of the above high data rate service and the proximity service well.

D2D communications may reuse cellular communication resources. Against a scenario with cellular network coverage, the D2D communication resources are usually scheduled and allocated by the base station, in this way, resource reuse efficiency may be increased while effects of the control of D2D communication by a network side and the interference coordination between the D2D communication and cellular communication are ensured. For a same UE, if it supports a D2D function, the D2D communication with another D2D UE and the cellular communication with the base station may be performed at the same time.

When the UE is in the coverage of densely deployed small cells, there is no reasonable method in the related art to make full use of advantages of dual connectivity and the D2D technology to ensure the implementation of a D2D discovery/communication service uncer dual connectivity, (i.e., the D2D discovery or communication continues while the dual connectivity is realized).

SUMMARY

The following is an overview of a subject matter described in detail in this application. This summary is not intended to limit the protection scope of claims.

In view of this, embodiments of the present disclosure are intended to provide a communication method and a base station.

A technical solution of the embodiment of the present disclosure is implemented as follows.

According to a first aspect, embodiments of the present disclosure provides a communication method, including: receiving, by a first base station, a first communication message from a second base station through an X2 interface, where the first communication message carries first device-to-device (D2D) capability information for representing a D2D capability of the second base station; and determining, by the first base station, whether to add the second base station to provide a dual-connectivity service to user equipment based on the first D2D capability information.

When the first base station sets up the X2 interface with the second base station, the step of receiving, by the first base station, a first communication message from a second base station through an X2 interface includes: after setting up the X2 interface successfully, receiving, by the first base station, a setup success response message from the second base station through the X2 interface, where the setup success response message carries the first D2D capability information.

Before setting up the X2 interface successfully, the method further includes: transmitting, by the first base station, a setup request message to the second base station.

After the step of transmitting, by the first base station, a setup request message to the second base station, the method further includes: after failing to set up the X2 interface, receiving, by the first base station, a setup failure message from the second base station, where the setup failure message carries a failure reason.

When base station configuration information of the second base station changes, the step of receiving, by a first base station, a first communication message from a second base station through an X2 interface includes: receiving, by the first base station, a base station configuration update message from the second base station through the X2 interface, where the base station configuration update message carries the first D2D capability information.

After the step of receiving, by the first base station, a base station configuration update message from the second base station through the X2 interface, the method further includes: after updating a base station configuration, transmitting, by the first base station, a base station configuration update acknowledgement message to the second base station.

After the step of receiving, by the first base station, a base station configuration update message from the second base station through the X2 interface, the method further includes: after failing to update the base station configuration, transmitting, by the first base station, a base station configuration update failure message to the second base station, where the base station configuration update failure message carries a failure reason.

The first D2D capability information includes: whether the second base station supports D2D, and at least one of a capability of the second base station to support D2D discovery and a capability of the second base station to support D2D communications.

According to a second aspect, embodiments of the present disclosure provides a communication method, including: receiving, by a master base station (MeNB), a second communication message from a secondary base station (SeNB) through an X2 interface, where the second communication message carries second device-to-device (D2D) capability information for representing a D2D capability of the SeNB; and implementing, by the MeNB, D2D discovery/communications of user equipment (UE) under dual connectivity based on the second communication message.

The step of receiving, by a MeNB, a second communication message from a SeNB through an X2 interface includes: transmitting, by the MeNB, an addition request message to the SeNB; and after adding the SeNB successfully, receiving, by the MeNB, an addition request acknowledgement message transmitted by the SeNB.

After the step of transmitting, by the MeNB, an addition request message to the SeNB, the method further includes: after failing to add the SeNB, receiving, by the MeNB, an addition request failure message transmitted by the SeNB, where the addition request failure message carries a failure reason.

The step of receiving, by the MeNB, a second communication message from a SeNB through an X2 interface includes: receiving, by the MeNB, a modification request message transmitted by the SeNB.

The second D2D capability information includes: whether the SeNB supports D2D, and at least one of a capability of the SeNB to support D2D discovery and a capability of the SeNB to support D2D communications.

According to a third aspect, embodiments of the present disclosure provides a base station, including a receiving unit and a determination unit; where the receiving unit is configured to receive a first communication message from a second base station through an X2 interface, where the first communication message carries first device-to-device (D2D) capability information for representing a D2D capability of the second base station; the decision unit is configured to determine, based on the first D2D capability information, whether to add the second base station to provide a dual-connectivity service to user equipment.

The base station further includes a connection setup unit configured to set up an X2 interface between the base station to which the connection setup unit belongs and the second base station; the receiving unit is configured to receive a setup success response message from the second base station through the X2 interface after the connection setup unit sets up the X2 interface successfully, where the setup success response message carries the first D2D capability information.

The base station further includes a transmitting unit, which is configured to transmit a setup request message to the second base station before the connection setup unit sets up the X2 interface successfully.

The receiving unit is further configured to receive a setup failure message from the second base station after the connection setup unit fails to set up the X2 interface, where the setup failure message carries a failure reason.

The receiving unit is further configured to receive a base station configuration update message from the second base station through the X2 interface when base station configuration information of the second base station changes, where the base station configuration update message carries the first D2D capability information.

The base station further includes a base station configuration updating unit and a transmitting unit, where the base station configuration updating unit is configured to update a base station configuration after the receiving unit receives the base station configuration update message; the transmitting unit is configured to transmit a base station configuration update acknowledgement message to the second base station after the base station configuration updating unit updates the base station configuration.

The base station further includes a base station configuration updating unit and a transmitting unit, where the base station configuration updating unit is configured to update a base station configuration after the receiving unit receives the base station configuration update message; the transmission unit is configured to transmit a base station configuration update failure message to the second base station after the base station configuration updating unit fails to update the base station configuration, where the base station configuration update failure message carries a failure reason.

According to a fourth aspect, embodiments of the present disclosure provides a base station, including a receiving unit and a device-to-device (D2D) unit; the receiving unit is configured to receive a second communication message from a SeNB through an X2 interface, where the second communication message carries second D2D capability information for representing a D2D capability of the SeNB; the D2D unit is configured to implement D2D discovery/communications of UE under dual connectivity based on the second communication message.

The base station further includes a transmitting unit configured to transmit an addition request message to the SeNB; the receiving unit is configured to receive an addition request acknowledgement message transmitted by the SeNB after the SeNB is added successfully.

The receiving unit is further configured to receive an addition request failure message transmitted by the SeNB after the SeNB fails to be added, where the addition request failure message carries a failure reason.

The receiving unit is configured to receive a modification request message transmitted by the SeNB.

According to another aspect of the embodiment of the present disclosure, there is further provided a computer readable storage medium storing computer executable instructions which, when being executed by a processor, implement one of the above communication methods.

According to yet another aspect of the embodiment of the present disclosure, there is further provided another computer readable storage medium storing computer executable instructions which, when being executed by a processor, implement another one of the above communication methods.

Embodiments of the present disclosure provide a communication method and a base station. In the communication method, a first base station receives a first communication message from a second base station through an X2 interface, where the first communication message carries device-to-device (D2D) capability information for representing a D2D capability of the second base station; and the first base station determines, based on the first D2D capability information, whether to add the second base station to provide a dual-connectivity service to user equipment. In this way, with respect to characteristics of a dual-connectivity service, the D2D service is implemented by information interaction and decision control at a network side in a complex environment of small base station. This ensures that the UE can perform the D2D service while realizing dual connectivity, thereby improving the efficiency and performance of the network.

Other aspects will become apparent upon reading and understanding accompanying drawings and detailed description.

DETAILED DESCRIPTION

A technical solution in embodiments of the present disclosure will be clearly and completely described below with reference to accompanying drawings in the embodiments of the present disclosure.

First Embodiment

This embodiment provides a communication method which is applied to a first base station. The first base station may be an eNB in a LTE network. Meanwhile, there is still a second base station, which may also be an eNB in the LTE network. The first base station and the second base station may provide a dual-connectivity service to UE.

Figure 2:
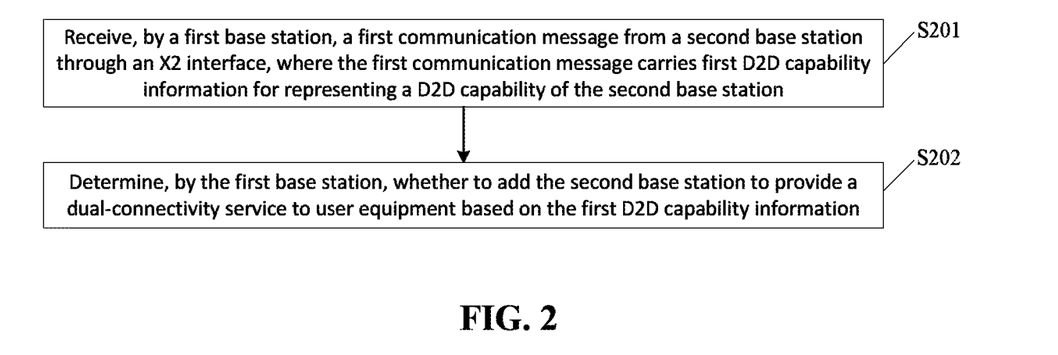
FIG. 2 is a flowchart of a communication method in a first embodiment of the present disclosure.

Then, with reference to FIG. 2, the method includes steps described below.

In step S201, the first base station receives a first communication message from the second base station through an X2 interface, where the first communication message carries first device-to-device (D2D) capability information for representing a D2D capability of the second base station.

In a specific implementation process, the step S201 may include, but not is limited to, two cases described below.

In a first case, when the first base station sets up the X2 interface with the second base station, the step S201 may include: after the X2 interface is set up successfully, the first base station receives a setup success response message from the second base station through an X2 interface, where the setup success response message carries the first D2D capability information.

Specifically, the first base station communicates with the second base station through the X2 interface. After the first base station sets up the X2 interface with the second base station successfully, the second base station may transmit the setup success response message to the first base station through the X2 interface. The setup success response message carries D2D capability information of the second base station, i.e., the first D2D capability information, which includes: whether the second base station supports D2D, a capability of the second base station to support D2D discovery, and a capability of the second base station to support D2D communications. The first D2D capability information may be D2D capability information at cell-level or may be D2D capability information of one or more serving cells of the base station. Certainly, the D2D capability information may further include other information capable of representing the D2D capability of the second base station, which is not particularly limited in this embodiment of the present disclosure.

In a practical application, before the X2 interface is set up successfully, the method further includes: the first base station transmits a setup request message to the second base station.

In an embodiment, in order to inform the second base station of the D2D capability of the first base station, the first base station may carry D2D capability information for representing the D2D capability of the first base station in the above setup request message. The D2D capability of the first station includes: whether the first base station supports D2D, a capability of the first base station to support D2D discovery and a capability of the first base station to support D2D communications. Likewise, the second D2D capability information may be D2D capability information at cell-level or may be D2D capability information of one or more serving cells of the base station.

In another embodiment, the first base station may also fail to set up the X2 interface due to factors such as restricted configuration and constrained resources. Then, after the X2 interface fails to be set up, the first base station receives a setup failure message from the second base station, where the setup failure message carries a failure reason.

In a second case, when base station configuration information of the second base station changes, the S201 may include: the first base station receives a base station configuration update message from the second base station through the X2 interface, where the base station configuration update message carries the first D2D capability information.

Specifically, in a process of serving the UE by the first base station and/or the second base station, when the base station configuration information of the second base station changes (e.g., change of information of a serving cell, change of information of the capability of the second base station to support D2D), the second base station transmits a base station configuration update message, which carries a first D2D capability information, to the first base station through the X2 interface to inform the first base station of a D2D capability of the second base station.

Certainly, the step S201 may also include other cases, which are not particularly limited in this embodiment of the present disclosure.

In step S202, the first base station determines, based on the first D2D capability information, whether to add the second base station to provide a dual-connectivity service to user equipment.

Specifically, after receiving the first D2D capability information, the first base station may determine, according to a local policy, whether to add the second base station to provide a dual-connectivity service to the UE. For instance, if the second base station supports D2D on the premise of the UE supporting the D2D discovery/communications, then when the first base station selects a suitable base station as a SeNB to realize dual connectivity with the UE, the second base station may preferentially serve as the SeNB.

In a practical application, for the above second case, after receiving the base station configuration update message, the second base station updates base station configuration In the meantime, the step S202 is performed. After the configuration is updated successfully, the first base station transmits a base station configuration update acknowledgement message to the second base station, and may determine, according to the local policy, whether to add the second base station to continue to provide the dual-connectivity service to the UE. For instance, when the first base station selects a suitable base station as the SeNB to realize dual connectivity with the UE on the premise of the UE supporting the D2D discovery/communications, the second base station supporting the D2D service may preferentially serve as a SeNB. When the D2D capability information of the second base station changes, decision information can be immediately provided to the subsequent dual connection operations.

Certainly, the second base station may also fail to update the base station configuration due to factors such as restrained configuration and constrained resources. Then, after the base station configuration fails to be updated, the first base station transmits a base station configuration update failure message to the second base station, where the base station configuration update failure message carries a failure reason.

It can be seen from the above that with respect to characteristics of a dual-connectivity service, D2D is implemented through information exchange and decision control at a network side in a complex environment of small base station to ensure that the UE may perform the D2D service while realizing dual connectivity, thereby improving the efficiency and performance of the network.

Second Embodiment

This embodiment of the present disclosure provides a communication method, which is applied to a system for providing a dual-connectivity service to UE, where the system has a MeNB and a SeNB.

Figure 3:
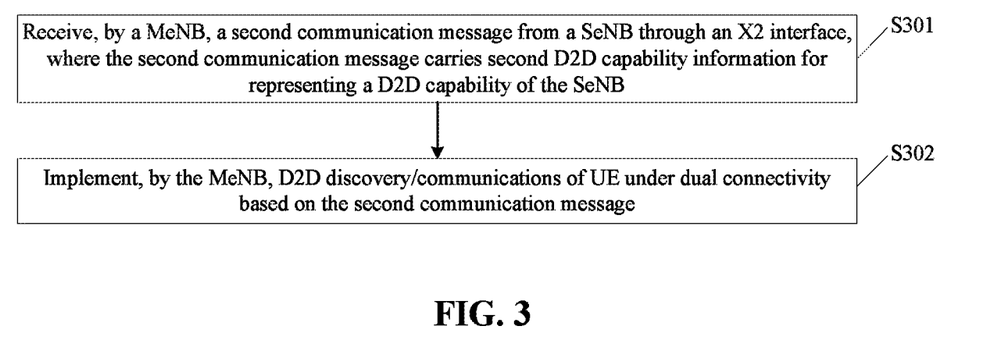
FIG. 3 is a flowchart of a communication method in a second embodiment of the present disclosure.

Then, with reference to FIG. 3, the method includes steps described below.

In step S301, the MeNB receives a second communication message from the SeNB through an X2 interface, where the second communication message carries second D2D capability information for representing a D2D capability of the SeNB.

Here, the second D2D capability information includes: whether the SeNB supports D2D, a capability of the SeNB to support D2D discovery, and a capability of the SeNB to support D2D communications. Likewise, the D2D capability information may be D2D capability information at cell-level or may be D2D capability information of one or more serving cells of the base station.

In a specific implementation process, the S301 may include, but is not be limited to, two cases described below.

In a first case, when the SeNB is added, the step S301 may include: the MeNB transmits an addition request message to the SeNB; and after the SeNB is added successfully, the MeNB receives an addition request acknowledgement message transmitted by the SeNB. The addition request confirmation message carries the second D2D capability information.

Specifically, when the SeNB is added, the MeNB transmits an addition request message to the SeNB selected by the MeNB. After receiving the addition request message, the SeNB performs a step of addition. After being added successfully, the SeNB transmits an addition request acknowledgement message to the MeNB. The addition request acknowledgement message indicates that the SeNB has been added as a secondary base station to provide the UE with the dual-connectivity service. The addition request acknowledgement message carries the second D2D capability information; and at this moment, the MeNB receives the addition request acknowledgement message transmitted by the SeNB.

In an embodiment, the above addition request information carries the D2D capability information for representing the D2D capability of the MeNB, so as to inform the SeNB of the D2D capability of the MeNB. The D2D capability information includes: whether the MeNB supports D2D, a capability of the MeNB to support D2D discovery, and a capability of the MeNB to support D2D communications. Likewise, the D2D capability information may be D2D capability information at cell-level or may be D2D capability information of one or more serving cells of the base station.

In a specific implementation process, after the above addition request information is received, the SeNB performs the step of addition. The addition of the SeNB may fail (e.g., the SeNB does not support D2D). At this moment, after the SeNB fails to be added, the MeNB receives the addition request failure message transmitted by the SeNB. The addition request failure message carries a failure reason.

In a second case, in a process of modifying the SeNB, the step S301 may include: the MeNB receives a modification request message transmitted by the SeNB, where the modification request message carries the second D2D capability information.

Certainly, the step S301 may also include other cases, which are not limited in the embodiment of the present disclosure.

In a practical application, after the above modification request message is received, the MeNB transmits a modification request acknowledgement message to the SeNB.

In step S302, the MeNB implements D2D discovery/communications of UE under dual connectivity based on the second communication message.

It can be seen from the above that with respect to characteristics of a dual-connectivity service, D2D is implemented through information exchange and decision control at a network side in a complex environment of small base station to ensure that UE may perform D2D services while realizing dual connectivity, thereby improving the efficiency and performance of the network.

Third Embodiment

This embodiment of the present disclosure further provides a base station, which is consistent with the first base station in the first embodiment described above.

Figure 4:
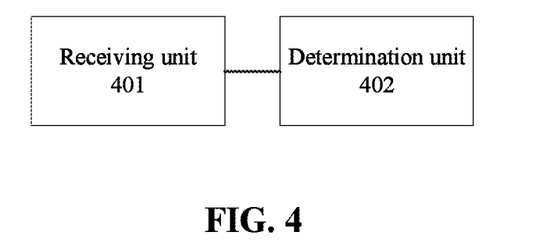
FIG. 4 is a structural diagram showing a base station in a third embodiment of the present disclosure.

With reference to FIG. 4, the base station includes a receiving unit 401 and a determination unit 402; the receiving unit 401 is configured to receive a first communication message from a second base station through an X2 interface, where the first communication message carries first device-to-device (D2D) capability information for representing a D2D capability of the second base station; the determination unit 402 is configured to determine, based on the first D2D capability information, whether to add the second base station to provide a dual-connectivity service to user equipment.

Figure 5:
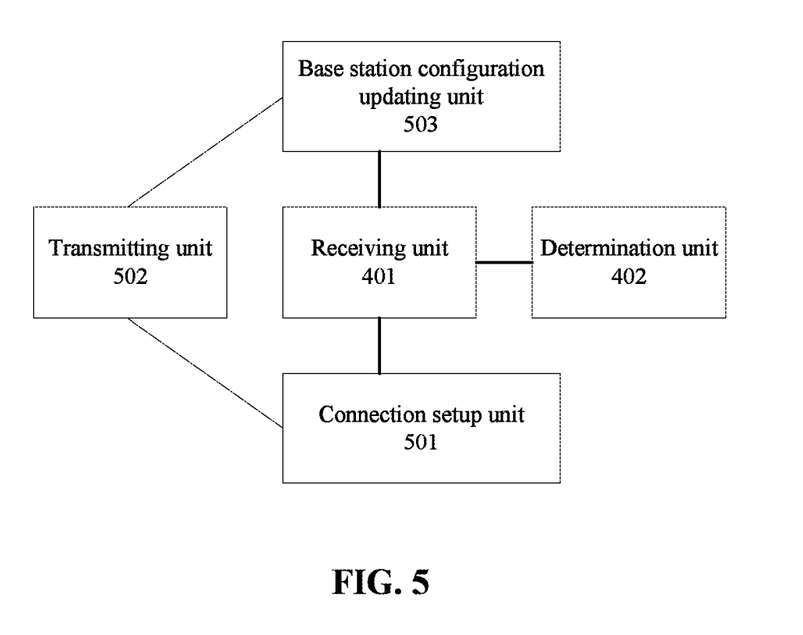
FIG. 5 is another structural diagram showing the base station in the third embodiment of the present disclosure.

With reference to FIG. 5, the base station further includes a connection setup unit 501 configured to set up an X2 interface between the base station to which the connection setup unit 501 belongs and the second base station;

correspondingly, the receiving unit 401 is configured to receive a setup success response message from the second base station through the X2 interface after the connection setup unit 501 sets up the X2 interface successfully, where the setup success response message carries the first D2D capability information.

The base station further includes a transmitting unit 502 configured to transmit a setup request message to the second base station before the connection setup unit 501 sets up the X2 interface successfully.

The receiving unit 401 is further configured to receive a setup failure message from the second base station after the connection setup unit 501 fails to set up the X2 interface, where the setup failure message carries a failure reason.

The receiving unit 401 is further configured to receive a base station configuration update message from the second base station through the X2 interface when base station configuration information of the second base station changes, where the base station configuration update message carries the first D2D capability information.

With reference to FIG. 5, the base station further includes a base station configuration updating unit 503 and a transmitting unit 502; the base station configuration updating unit 503 is configured to update a base station configuration after the receiving unit 401 receives the base station configuration update message; the transmitting unit 502 is configured to transmit a base station configuration update acknowledgement message to the second base station after the base station configuration updating unit 503 updates the base station configuration.

The base station configuration updating unit 503 is configured to update a base station configuration after the receiving unit 401 receives the base station configuration update message; and the transmitting unit 502 is configured to transmit a base station configuration update failure message to the second base station after the base station configuration updating unit 503 fails to update the base station configuration, where the base station configuration update failure message carries a failure reason.

It should be noted that the description of the above embodiment of the base station is similar to the description of the above method, and has the same beneficial effects as the embodiment of the method, which will not be repeated. Those skilled in the art may understand technical details which are not disclosed in the embodiment of the base station of the present disclosure with reference to the embodiment of the method of the present disclosure, which will not be repeated for the sake of simplicity.

Fourth Embodiment

This embodiment of the present disclosure provides a base station which is the MeNB of two base stations that provide a dual-connectivity service to UE, and the MeNB is consistent with the MeNB in the second embodiment.

Figure 6:
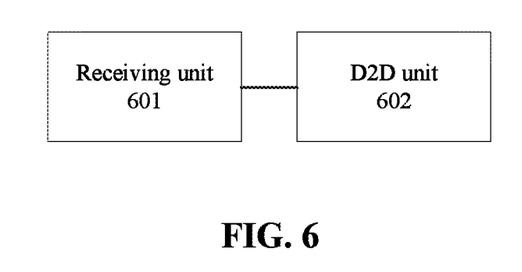
FIG. 6 is a structural diagram showing a base station in a fourth embodiment of the present disclosure.

With reference to FIG. 6, the base station includes a receiving unit 601 and a D2D unit 602; the receiving unit 601 is configured to receive a second communication message from a SeNB through an X2 interface, where the second communication message carries second D2D capability information for representing a D2D capability of the SeNB; the D2D unit is configured to implement D2D discovery/communications of UE under dual connectivity based on the second communication message.

The base station further includes a transmitting unit configured to transmit an addition request message to the SeNB. Correspondingly, the receiving unit 601 is configured to receive an addition request acknowledgement message transmitted by the SeNB after the SeNB is added successfully.

The receiving unit 601 is further configured to receive an addition request failure message transmitted by the SeNB after the SeNB fails to be added, where the addition request failure message carries a failure reason.

The receiving unit 601 is configured to receive a modification request message transmitted by the SeNB.

In another embodiment, there is provided a computer readable storage medium storing computer executable instructions which, when being executed by a processor, implement one of the above communication methods. The storage medium includes, but is not limited to, an optical disk, a floppy disk, a hard disk, a rewritable memory and the like.

In yet another embodiment, there is provided a computer readable storage medium storing computer executable instructions which, when being executed by a processor, implement another one of the above communication methods. The storage medium includes, but is not limited to, an optical disk, a floppy disk, a hard disk, a rewritable memory and the like.

It should be noted that the description of the above embodiment of the base station is similar to the description of the above method, and has the same beneficial effects as the embodiments of the method, which will not be repeated. Those skilled in the art may understand technical details which are not disclosed in the embodiment of the base station of the present disclosure with reference to the embodiment of the method of the present disclosure, which will not be repeated for the sake of simplicity.

Those skilled in the art should understand that the embodiments of the present disclosure may provide a method, a system, or a computer program product. Therefore, the embodiments of the present disclosure may take the form of hardware embodiments, software embodiments, or a combination of software embodiments and hardware embodiments. Moreover, the embodiments of the present disclosure may take the form of a computer program product embodied on one or more computer usable storage media (including, but not limited to, a magnetic disk storage and an optical storage) containing a computer usable program code.

The embodiments of the present disclosure are described with reference to flowcharts and/or block diagrams of the method, the device (system), and the computer program product according to the embodiments of the present disclosure. It should be understood that each flow and/or block in the flowcharts and/or block diagrams, and a combination of flows and/or blocks in the flowcharts and/or block diagrams may be implemented by these computer program instructions. These computer program instructions may be provided to a processor of a general purpose computer, a special purpose computer, an embedded processor, or other programmable data processing devices to produce a machine, such that the instructions executed by the processor of the computer or other programmable data processing devices produce a means for implementing a functionality specified in one or more flows in the flowcharts and/or one or more blocks in the block diagrams.

These computer program instructions may also be stored in a computer readable memory that can direct a computer or other programmable data processing devices to function in a particular manner, such that the instructions stored in the computer readable memory produce an article of manufacture including an instructing means that implements a functionality specified in one or more flows in the flowcharts and/or one or more blocks in the block diagrams.

These computer program instructions may also be loaded onto a computer or other programmable data processing devices to cause a series of operating steps to be performed on the computer or other programmable devices to produce a computer-implemented process such that the instructions executed on the computer or other programmable devices provide steps for implementing a functionality specified in one or more flows in the flowcharts and/or one or more blocks in the block diagrams.

The foregoing descriptions are merely preferred embodiments of the present disclosure and are not intended to limit a protective scope of the present disclosure.

INDUSTRIAL APPLICABILITY

Embodiments of the present disclosure provide a communication method and a base station. The communication method includes: a first base station receives a first communication message from a second base station through an X2 interface, where the first communication message carries first D2D capability information for representing a D2D capability of the second base station; and the first base station determines, based on the first D2D capability information, whether to add the second base station for providing a dual-connectivity service to user equipment.

Embodiments of the present disclosure provide a communication method and a base station. The communication method includes: a MeNB receives a second communication message from a SeNB through an X2 interface, where the second communication message carries second D2D capability information for representing a D2D capability of the SeNB; and the MeNB implements D2D discovery/communications of UE under dual connectivity based on the second communication message.

With respect to characteristics of a dual-connectivity service, the communication method and the base station provided by the embodiments of the present disclosure realize D2D through information interface and decision control at a network side in a complex environment of small base station. This ensures that the UE can perform the D2D service while realizing dual connectivity, thereby improving the efficiency and performance of the network.

What is claimed is:
1. A communication method, comprising:
receiving, by a first base station, a first communication message from a second base station through an X2 interface, wherein the first communication message includes first device-to-device (D2D) capability information for representing a D2D capability of the second base station, wherein the first D2D capability information comprises: whether the second base station supports D2D, a capability of the second base station to support D2D discovery and a capability of the second base station to support D2D communications; and
determining, by the first base station, whether to add the second base station to provide a dual-connectivity service to user equipment based on the first D2D capability information.

2. The method according to claim 1, wherein in response to determining that the first base station sets up the X2 interface with the second base station, receiving, by the first base station, the first communication message from the second base station through the X2 interface comprises:
after setting up the X2 interface successfully, receiving, by the first base station, a setup success response message from the second base station through the X2 interface, wherein the setup success response message includes the first D2D capability information.

3. The method according to claim 2, wherein before setting up the X2 interface successfully, the method further comprises:
transmitting, by the first base station, a setup request message to the second base station.

4. The method according to claim 2, wherein after transmitting, by the first base station, the setup request message to the second base station, the method further comprises:
after failing to set up the X2 interface, receiving, by the first base station, a setup failure message from the second base station, wherein the setup failure message includes a failure reason.

5. The method according to claim 1, wherein in response to determining that base station configuration information of the second base station has changed, receiving, by the first base station, the first communication message from the second base station through the X2 interface comprises:
receiving, by the first base station, a base station configuration update message from the second base station through the X2 interface, wherein the base station configuration update message includes the first D2D capability information.

6. The method according to claim 5, wherein after receiving, by the first base station, the base station configuration update message from the second base station through the X2 interface, the method further comprises:
after updating a base station configuration, transmitting, by the first base station, a base station configuration update acknowledgement message to the second base station.

7. The method according to claim 5, wherein after the step of receiving, by the first base station, the base station configuration update message from the second base station through the X2 interface, the method further comprises:
after failing to update the base station configuration, transmitting, by the first base station, a base station configuration update failure message to the second base station, wherein the base station configuration update failure message includes a failure reason.

8. A communication method, comprising:
receiving, by a master base station (MeNB), a second communication message from a secondary base station (SeNB) through an X2 interface, wherein the second communication message includes second device-to-device (D2D) capability information for representing a D2D capability of the SeNB, wherein the second D2D capability information comprises: whether the SeNB supports D2D, a capability of the SeNB to support D2D discovery and a capability of the SeNB to support D2D communications; and
implementing, by the MeNB, D2D discovery/communications of user equipment (UE) under dual connectivity based on the second communication message.

9. The method according to claim 8, wherein receiving, by the MeNB, the second communication message from the SeNB through the X2 interface comprises:
   transmitting, by the MeNB, an addition request message to the SeNB; and
   after adding the SeNB successfully, receiving, by the MeNB, an addition request acknowledgement message transmitted by the SeNB.

10. The method according to claim 9, wherein after transmitting, by the MeNB, the addition request message to the SeNB, the method further comprises:
   after failing to add the SeNB, receiving, by the MeNB, an addition request failure message transmitted by the SeNB, wherein the addition request failure message includes a failure reason.

11. The method according to claim 8, wherein receiving, by the MeNB, the second communication message from the SeNB through the X2 interface comprises:
   receiving, by the MeNB, a modification request message transmitted by the SeNB.

12. A base station, comprising:
   a receiver configured to receive a first communication message from a second base station through an X2 interface, wherein the first communication message includes first device-to-device (D2D) capability information for representing a D2D capability of the second base station, wherein the first D2D capability information comprises: whether the second base station supports D2D, a capability of the second base station to support D2D discovery and a capability of the second base station to support D2D communications; and
   a determiner configured to determine, based on the first D2D capability information, whether to add the second base station to provide a dual-connectivity service for user equipment.

13. The base station according to claim 12, further comprising:
   a connection establisher configured to set up an X2 interface between the base station to which the connection establisher belongs and the second base station,
   wherein the receiver is configured to receive a setup success response message from the second base station through the X2 interface after the connection establisher sets up the X2 interface successfully, the setup success response message includes the first D2D capability information.

14. The base station according to claim 13, further comprising:
   a transmitter configured to transmit a setup request message to the second base station before the connection establisher sets up the X2 interface successfully.

15. The base station according to claim 13, wherein the receiver is further configured to receive a setup failure message from the second base station after the connection establisher fails to set up the X2 interface, wherein the setup failure message includes a failure reason.

16. The base station according to claim 12, wherein the receiver is further configured to receive a base station configuration update message from the second base station through the X2 interface in response to determining that base station configuration information of the second base station changes, wherein the base station configuration update message includes the first D2D capability information.

17. The base station according to claim 16, further comprising:
   a base station configuration updater configured to update a base station configuration after the receiver receives the base station configuration update message; and
   a transmitter configured to transmit a base station configuration update acknowledgement message to the second base station after the base station configuration updater updates the base station configuration.

18. The base station according to claim 16, further comprising:
   a base station configuration updater configured to update a base station configuration after the receiver receives the base station configuration update message; and
   a transmitter configured to transmit a base station configuration update failure message to the second base station after the base station configuration updater fails to update the base station configuration, wherein the base station configuration update failure message includes a failure reason.

* * * * *